D. ELDER.
AUTOMATIC STARTING AND STOPPING MECHANISM FOR IRRIGATION SYSTEMS.
APPLICATION FILED JULY 19, 1915.

1,272,404.

Patented July 16, 1918.
2 SHEETS—SHEET 1.

D. Elder.
Inventor

By Croydon Marks.
Attorney

D. ELDER.
AUTOMATIC STARTING AND STOPPING MECHANISM FOR IRRIGATION SYSTEMS.
APPLICATION FILED JULY 19, 1915.
1,272,404.
Patented July 16, 1918.
2 SHEETS—SHEET 2.
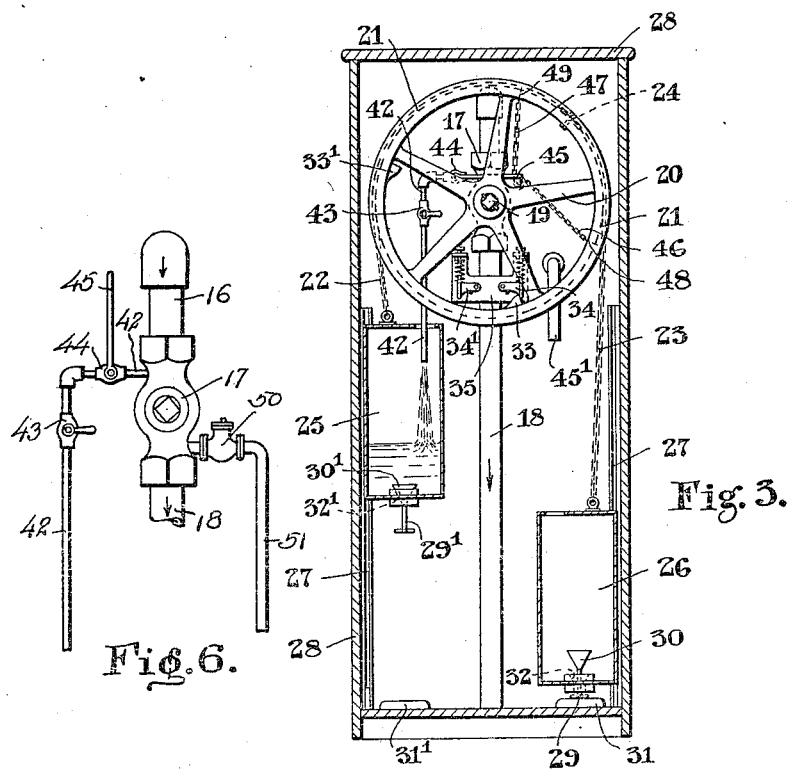
Fig. 3.
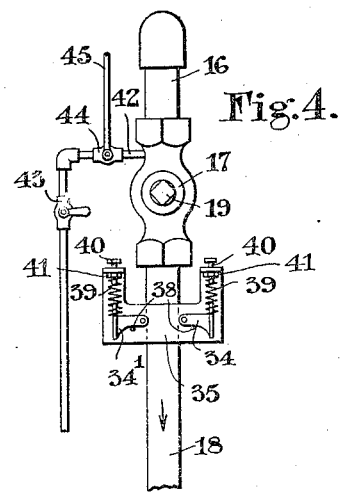
Fig. 6.
Fig. 4.
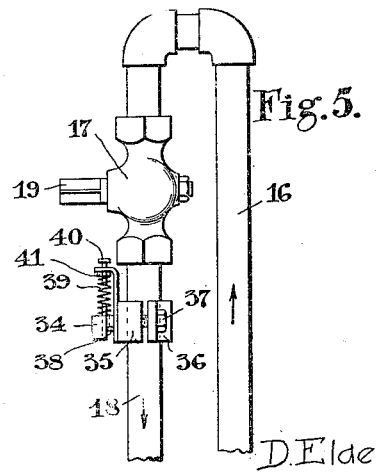
Fig. 5.
D. Elder.
Inventor
By Attorney
G. Croydon Marks.

UNITED STATES PATENT OFFICE.

DONALD ELDER, OF ONEHUNGA, NEW ZEALAND, ASSIGNOR, BY MESNE ASSIGNMENTS, TO AUTOMATIC IRRIGATING MACHINERY CORPORATION, A CORPORATION OF NEW YORK.

AUTOMATIC STARTING AND STOPPING MECHANISM FOR IRRIGATION SYSTEMS.

1,272,404.  Specification of Letters Patent.  Patented July 16, 1918.

Application filed July 19, 1915. Serial No. 40,693.

*To all whom it may concern:*

Be it known that I, DONALD ELDER, a citizen of the Dominion of New Zealand, residing at Onehunga, Auckland, New Zealand, have invented certain new and useful Improvements in Automatic Starting and Stopping Mechanism for Irrigation Systems, of which the following is a specification.

This invention relates to an automatic starting and stopping, or repeating mechanism, which is particularly applicable to the automatic supplying and cutting off of water or other liquid to and from a spraying or irrigating system of the character described and illustrated in my prior patent specification No. 1121618.

The object of the invention is to provide a mechanism by the use of which water or other liquid is supplied to a spraying system and is automatically cut off therefrom after the whole system has been operated, and is again automatically supplied to said system, either immediately or after the lapse of a predetermined period of time.

To this end, the invention consists in the novel construction, arrangement and combination of parts herein shown and described and particularly pointed out in the appended claims.

In the accompanying drawings:—

Fig. 3 is a front elevation of one embodiment of the automatic starting and stopping, or repeating mechanism, in accordance with this invention;

Fig. 4 is a front elevation of certain of the parts shown in Fig. 3, and

Fig. 5 is a side elevation of the parts shown in Fig. 4.

Fig. 6 is a front elevation of a modified construction of the starting and stopping mechanism.

Figure 1:
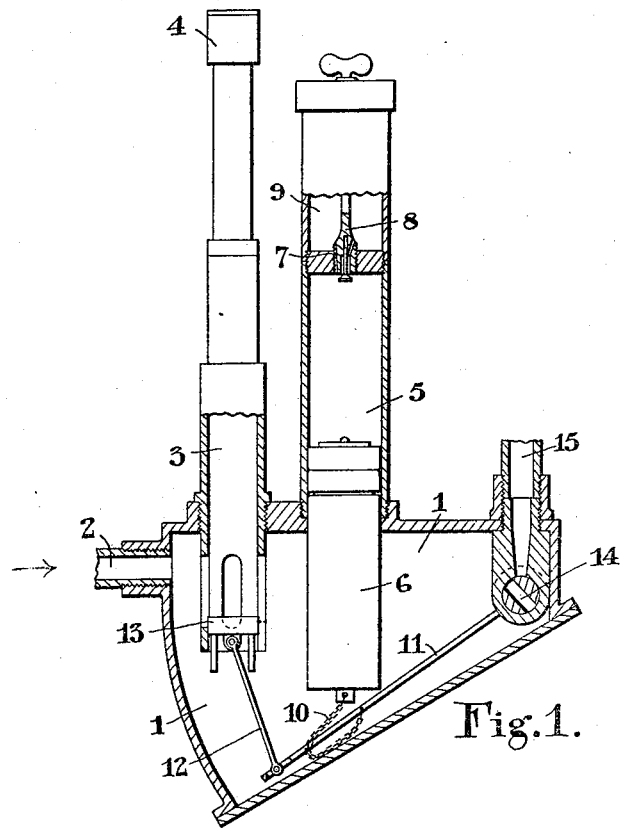
Figure 1 is a longitudinal elevation, partly in section, of a sprayer and automatic cut-off mechanism, which may form part of an irrigating or spraying system.

The sprayer and cut-off mechanism illustrated in Fig. 1 operates upon the same principle as that described in the specification of the patent referred to above, although the construction differs slightly from that illustrated in said specification.

Figure 2:
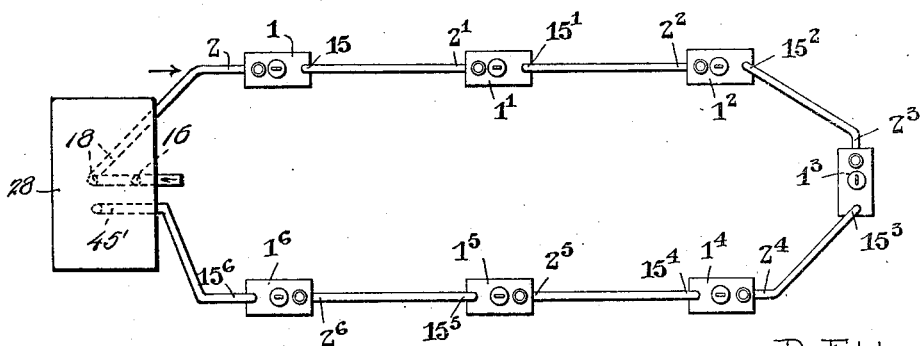
Fig. 2 is a diagram of an irrigating or spraying system comprising a plurality of sprayers and cut-off mechanisms as illustrated in Fig. 1.

The mechanism comprises a chamber 1, to which water or other liquid under high pressure is supplied through an inlet 2 and from which said water passes through a pipe 3 to a spraying nozzle 4 of suitable form. A chamber 5 communicates with chamber 1 at its lower end and has a piston 6 movable upwardly therein under the pressure of the water in chamber 1. The chamber 5 is filled with water which is gradually forced therefrom through a restricted passage 7 in an adjustable plug 8, into an upper chamber 9, as the piston 6 is raised, the rate of displacement of the water from chamber 5 determining the time necessary for the piston to reach the limit of its upward movement. The piston 6 is connected by a chain or the like 10, with a lever 11, which is connected by a link 12 with a valve 13 working in the pipe 3, so that when the piston reaches its upper position, the valve 13 closes the pipe 3 and cuts off the passage of the water to the spraying nozzle. The lever 11 is connected at its pivot end to a plug valve 14, so that when the piston 6 reaches its upper position and the spraying nozzle is cut off, the valve 14 is turned to establish communication between the chamber 1 and an outlet pipe 15, which when a plurality of spraying mechanisms are employed, as in Fig. 2, conducts the water from chamber 1 to the inlet 2' of the chamber 1' of a second mechanism in which the same operation is repeated. When the sprayer of this second mechanism is cut off, the water passes through pipe 15' to the inlet $2^2$ of a third chamber $1^2$, and so on through the chambers of the plurality of mechanisms, the sprayers of said mechanisms being thus successively put into and out of operation.

Referring now to the automatic starting and stopping, or repeating, mechanism as illustrated in Figs. 3–5, the pipe 16 (Fig. 5) is connected to any suitable source of water or other liquid under pressure, and is connected by means of a cock or valve 17 with a pipe 18, which, when the cock is open conducts the water to the inlet 2 of the chamber 1 of the first sprayer.

On the stem 19 of the cock 17 is mounted a wheel 20, having a grooved rim 21, in which are arranged two chains 22 and 23, which are connected to the rim at 24 in any suitable manner and extend around the wheel in opposite directions. Connected to the chain 22 is a bucket or water receptacle 25, and a similar bucket or receptacle 26 is connected to the chain 23. These buckets are guided for vertical movement by means of guides such as 27 on the sides of a casing 28 in which the mechanism is located. When the cock or valve 17 is closed the buckets 25 and 26 occupy the positions shown in Fig. 3 and in this position the lower end of the stem 29 of a valve 30 at the lower end of the bucket 26, is in contact with a pad 31 of suitable material, on the bottom of the casing, so that the valve is raised from its seating 32. The bucket 25 is provided with a similar valve 30', valve stem 29' and seating 32', and a pad 31' is also located directly below the valve, the latter, however, engaging the seating 32' in the upper position of the receptacle.

The buckets or receptacles 25, 26, and the wheel 20 and cock 17 are held in the positions shown in Fig. 3, by the engagement of a lug or projection 33 on the wheel rim 21, with a catch 34, this catch being pivoted on a two-part bracket, the parts 35 and 36 of which are shaped to fit the pipe 18 and are secured thereon by bolts 37. The catch 34 is pressed against a stop 38 by a coiled spring 39, the other end of which surrounds a screw 40 threaded into an offset of the bracket 35. A nut 41 is adjustable on the screw 40 in order to vary the pressure of the spring.

A second lug or projection 33' is provided on the wheel rim 21 and is adapted to engage a second catch 34' on the bracket 35, in order to hold the buckets 25, 26 in the reverse positions, with the cock 17 in open position.

A pipe or conduit 42 of small diameter communicates with the pipe 16, in advance of the cock 17, preferably being screwed into the body of the cock on that side thereof which is connected to the pipe 16. The passage through the pipe 42 is controlled by means of two cocks 43 and 44, the latter of which has connected to its stem a lever 45, the other end of which is connected to two chains 46, 47, attached at 48, 49 respectively to the wheel rim 21. When the cock 17 is closed, the cock 44 is open, and vice versa, and when the spraying or irrigating system is not in operation, the cock 43 may also be closed, or the supply of liquid to the pipe 16 cut off.

The operation of the mechanism is as follows:—

When it is desired to start the irrigating or spraying system into operation, liquid is supplied to the pipe 16 and the cock 43 if closed is opened to allow the escape of water into the bucket or receptacle 25, in the manner more fully described hereafter, or to save time, the wheel 20 may be turned by hand in a counter-clockwise direction, in addition to the opening of said cock. This turning of the wheel lowers the bucket 25 and raises the bucket 26, closes the cock 44 and opens the cock 17, and the catch 34' snaps behind the lug 33' and holds the wheel and connected parts in this position.

The opening of the cock 17 allows the water to pass through pipe 17 to the inlet 2 of the chamber 1 of the first sprayer, the water then passing successively to the other sprayers of the system, in the manner previously described.

The outlet pipe 15⁶ from the chamber 1⁶ of the last sprayer of the system, which pipe may be termed a return pipe, passes into, or is connected with a pipe 45' located in, the casing 28, said pipe extending into the bucket 26 when the latter is in its elevated position. Thus when the last sprayer is put out of operation the water passes through pipe 15⁶, into the bucket 26, and on reaching a certain level therein, the weight of the water becomes sufficient to cause the lug 33' to press the catch 34' upwardly thus releasing the wheel 20, which is turned by the descending bucket, and water, in a clockwise direction, and effects the closing of cock 17, thus cutting off the spraying system from the water supply. When the bucket 26 reaches its lowest position, its valve 30 is opened, by contact of the stem 29 with the pad 31, and the water in the bucket escapes into the casing and is conducted therefrom by suitable means. The catch 34 will snap behind the lug 33 and will hold the parts in the position shown in Fig. 3. The cocks 43 and 44 are now open and water from pipe 16 passes through pipe 42 into the bucket 25 and when the water reaches a certain level in the bucket its weight becomes sufficient to cause lug 33 to press catch 34 upwardly, to release the wheel 20, which is turned in an anti-clockwise direction by the descending bucket and water to again open the cock 17 and close cock 44. The bucket 25 is emptied by the contact of stem 29' of valve 30' with pad 31', as described with reference to bucket 26. Water again passes to the spraying system and after passing completely therethrough, returns through pipe 45' to bucket 26, the filling of which again closes the cock 17 and opens the cock 44.

This starting and stopping of the spraying system will be automatically repeated until the cock 43 is again closed, or the water supply to the conduit 16 shut off, and by the adjustment of this cock 43, the amount of water passing through the pipe 42, and thus the time taken to fill the bucket 25, may be varied so that after being stopped, the spraying system is started into operation again almost immediately, or after the lapse of a number of hours or even days.

If a single sprayer is used, or a single water chamber 1 having a plurality of sprayers connected thereto, the outlet pipe 15 thereof would be connected directly to the casing 28, so as to fill the bucket 26 as soon as the sprayer or sprayers is or are put out of operation.

Should the sprayer mechanism or the last mechanism of a series, be too far away from the casing for the outlet pipe thereof to be connected to the casing, then water is caused to pass to the bucket 26, to fill the same, by the provision of a high pressure relief valve 50, of any suitable form, which may be screwed into the cock 17 on the side thereof opposite to that at which pipe 42 is located. When the sprayer mechanism, or the last thereof is cut off, the pressure in the system increases, as there is no escape for the water, and the increased pressure will cause said relief valve 50 to open and allow passage of water through a suitable pipe 51 into the bucket 26, which when filled closes the cock 17 as described.

It is to be understood that I do not wish to limit myself to the exact form of mechanism illustrated and described herein, since this may be variously modified within the scope of the invention. The invention may also be applied to spraying systems other than that described in the above mentioned patent specification.

I claim:—

1. Mechanism of the character described, comprising in combination, a conduit connected to a source of liquid supply, a valve located in said conduit, a liquid receptacle, means operated by the pressure of said liquid for controlling the supply of liquid to said receptacle, and means operated by the weight of liquid in said receptacle for closing said valve.

2. Mechanism of the character described, comprising in combination, a conduit connected to a source of liquid supply, a valve located in said conduit, a liquid receptacle, a normally closed conduit for supplying liquid to said receptacle, means operated by the pressure of said liquid for opening said conduit, and means operated by the weight of liquid in said receptacle for closing said valve.

3. Mechanism of the character described, comprising in combination, a conduit connected to a source of liquid supply, a valve located in said conduit, a liquid receptacle, means operated by the pressure of said liquid for controlling the supply of liquid to said receptacle, means operated by the weight of liquid in said receptacle for closing said valve, a second liquid receptacle, means connected to said conduit in advance of said valve and operated by the last mentioned means for supplying liquid to said second receptacle, and means operated by the weight of liquid in the second receptacle for opening said valve.

4. Mechanism of the character described, comprising in combination, a conduit connected to a source of liquid supply, a valve located in said conduit, a liquid receptacle, a normally closed conduit for supplying liquid to said receptacle, means operated by the pressure of said liquid for opening said conduit, means operated by the weight of liquid in said receptacle for closing said valve, a second liquid receptacle, means connected to said conduit in advance of said valve and operated by the last mentioned means for supplying liquid to said second receptacle, and means operated by the weight of liquid in the second receptacle for opening said valve.

5. Mechanism of the character described, comprising in combination, a conduit connected to a source of liquid supply, a valve located in said conduit, a liquid receptacle, a conduit for supplying liquid to said receptacle, liquid pressure operated valve means for controlling the passage of liquid to said conduit, and means operated by the weight of liquid in said receptacle for closing the first mentioned valve.

6. Mechanism of the character described, comprising in combination, a conduit connected to a source of liquid supply, a valve located in said conduit, a liquid receptacle, means operated by the pressure of said liquid for controlling the supply of liquid to said receptacle, means for controlling the time of operation of said pressure operated means, and means operated by the weight of liquid in said receptacle for closing said valve.

7. Mechanism of the character described, comprising in combination, a conduit connected to a source of liquid supply, a valve located in said conduit, a liquid receptacle, means operated by the pressure of said liquid for controlling the supply of liquid to said receptacle, a second liquid receptacle, a conduit connected to the first conduit in advance of the valve therein, a cock in the last mentioned conduit, means operated by the weight of liquid in the first receptacle for closing said valve and opening said cock, to supply liquid to the second receptacle, and means operated by the weight of liquid in the second receptacle for opening said valve and closing said cock.

8. Mechanism of the character described, comprising in combination, a conduit connected to a source of liquid supply, a valve located in said conduit, a liquid receptacle, a normally closed conduit for supplying liquid to said receptacle, means operated by the pressure of said liquid for opening said conduit, a second liquid receptacle, a conduit connected to the first conduit in advance of the valve therein, a cock in the last mentioned conduit, means operated by the weight of liquid in the first receptacle for closing said valve and opening said cock, to supply liquid to the second receptacle, and means operated by the weight of liquid in the second receptacle for opening said valve and closing said cock.

9. Mechanism of the character described, comprising in combination, a conduit connected to a source of liquid supply, a valve located in said conduit, a liquid receptacle, a wheel connected to the stem of said valve, a flexible connection between said receptacle and said wheel, and means operated by the pressure of said liquid for controlling the supply of liquid to said receptacle, the latter being movable by the weight of liquid therein to turn the wheel to close the valve.

10. Mechanism of the character described, comprising in combination, a conduit connected to a source of liquid supply, a valve located in said conduit, a liquid receptacle, a normally closed conduit for supplying liquid to said receptacle, a wheel connected to the stem of said valve, a flexible connection between said receptacle and said wheel, and means operated by the pressure of said liquid for opening the last mentioned conduit, said receptacle being movable by the weight of liquid therein to turn the wheel to close the valve.

11. Mechanism of the character described, comprising in combination, a conduit connected to a source of liquid supply, a valve in said conduit, mechanism operated by the weight of a body of said liquid for closing said valve, and mechanism operated by the pressure of said liquid for supplying liquid to the first named mechanism.

12. Mechanism of the character described, comprising in combination, a conduit connected to a source of liquid supply, a valve in said conduit, mechanism operated by the weight of a body of said liquid for closing said valve, and mechanism operated by the pressure of said liquid after a predetermined time interval for supplying liquid to the first named mechanism.

13. Mechanism of the character described, comprising in combination, a conduit connected to a source of liquid supply, a valve in said conduit, mechanism operated by the weight of a body of said liquid for closing said valve, and valve means operated by the pressure of said liquid for controlling the supply of liquid to the first named mechanism.

14. Mechanism of the character described, comprising in combination, a conduit connected to a source of liquid supply, a valve in said conduit, mechanism operated by the weight of a body of said liquid for completely closing said valve, mechanism operated by the pressure of said liquid for supplying liquid to the first named mechanism, and mechanism set into operation by the first named mechanism for opening said valve after a predetermined time interval.

15. Mechanism of the character described, comprising in combination, a conduit connected to a source of liquid supply, a valve located in said conduit, a liquid receptacle, means operated by the pressure of said liquid for supplying liquid to said receptacle, means for normally preventing the closing of said valve, and means operated by the weight of liquid in said receptacle for overcoming the action of the last mentioned means and closing said valve.

16. Mechanism of the character described, comprising in combination, a conduit connected to a source of liquid supply, a valve located in said conduit, a liquid receptacle, means operated by the pressure of said liquid for supplying liquid to said receptacle, a wheel connected to the stem of said valve, a catch normally engaging said wheel to prevent turning thereof to close said valve, and a flexible connection between said receptacle and said wheel, said receptacle being movable by a predetermined weight of liquid therein to overcome said catch and turn the wheel to close the valve.

17. Mechanism of the character described, comprising in combination, a conduit connected to a source of liquid supply, a valve located in said conduit, a liquid receptacle, a second conduit connected with the first conduit in advance of said valve for supplying liquid to said receptacle, a cock in said second conduit, means operated by the weight of liquid in said receptacle for opening said valve and closing said cock, and means operated by the pressure of said liquid for closing said valve and opening said cock.

18. Mechanism of the character described, comprising in combination, a conduit connected to a source of liquid supply, a valve located in said conduit, a liquid receptacle, a second conduit connected with the first conduit in advance of said valve for supplying liquid to said receptacle, a cock in said second conduit, means operated by the weight of liquid in said receptacle for opening said valve and closing said cock, and means operated by the pressure of said liquid after a predetermined time interval for closing said valve and opening said cock.

19. Mechanism of the character described, comprising in combination, a conduit connected to a source of liquid supply, a valve located in said conduit, a liquid receptacle, means connected with said conduit in advance of said valve for supplying liquid to said receptacle, a wheel connected to the stem of said valve, a flexible connection between said receptacle and said wheel, said receptacle being movable by the weight of liquid therein to turn the wheel to open the valve, and means operated by the pressure of said liquid to turn the wheel to close the valve.

20. Mechanism of the character described, comprising in combination, a conduit connected to a source of liquid supply, a valve located in said conduit, a liquid receptacle, a second conduit connected with the first conduit in advance of said valve for supplying liquid to said receptacle, a cock in said second conduit, a wheel connected to the stem of said valve, a flexible connection between said receptacle and said wheel, said receptacle being movable by the weight of liquid therein to turn the wheel to open the valve, means on said wheel for closing said cock when so turned, and means operated by the pressure of said liquid to turn the wheel to close the valve.

21. Mechanism of the character described, comprising in combination, a conduit connected to a source of liquid supply, a valve located in said conduit, a liquid receptacle, means connected with said conduit in advance of said valve for supplying liquid to said receptacle, a wheel connected to the stem of said valve, a catch normally engaging said wheel to prevent turning thereof, and a flexible connection between said receptacle and said wheel, said receptacle being movable by the weight of liquid therein to overcome said catch and turn the wheel to open the valve.

22. Mechanism of the character described, comprising in combination, a conduit connected with a source of liquid supply, a valve located in said conduit, a liquid receptacle, means connected with said conduit in advance of said valve for supplying liquid to said receptacle, means operated by the weight of liquid in said receptacle for opening said valve, a second liquid receptacle, a second conduit normally closed, means operated by the pressure of said liquid after a definite period for opening said second conduit, for supplying liquid to said second receptacle, and means operated by the weight of liquid in said receptacle for closing said valve.

23. Mechanism of the character described, comprising in combination, a conduit connected with a source of liquid supply, a valve located in said conduit, a liquid receptacle, means connected with said conduit in advance of said valve for supplying liquid to said receptacle, a wheel connected with the stem of said valve, a flexible connection between said wheel and said receptacle, the latter being movable by the weight of liquid therein to turn the wheel and open the valve, a second liquid receptacle, a second conduit normally closed, means operated by the pressure of said liquid after a definite period for opening said second conduit, for supplying liquid to said second receptacle, a flexible connection between said wheel and said receptacle, the latter being movable by the weight of liquid therein to turn the wheel and close said valve.

24. Mechanism of the character described, comprising in combination, a conduit connected with a source of liquid supply, a valve located in said conduit, a liquid receptacle, a second conduit connected with the first conduit in advance of said valve for supplying liquid to said receptacle, a cock in said second conduit, a lever on said cock, a wheel connected with the stem of said valve, a flexible connection between said wheel and said receptacle, a flexible connection between said wheel and said lever, the receptacle being movable by the weight of liquid therein to turn the wheel to open the valve and close the cock, a second liquid receptacle, a second conduit normally closed, means operated by the pressure of said liquid after a definite period for opening said second conduit, for supplying liquid to said second receptacle, a flexible connection between said wheel and the second receptacle, a second flexible connection between the wheel and the lever of said cock, the receptacle being movable by the weight of liquid therein to turn the wheel to close said valve and open said cock.

25. Mechanism of the character described, comprising in combination, a conduit connected to a source of liquid supply, a valve in said conduit, mechanism operated by the weight of a body of said liquid for closing said valve, mechanism operated by the pressure of said liquid for supplying liquid to the first named mechanism, mechanism operated by the weight of a body of liquid for opening said valve, a second conduit connected to the first conduit in advance of the valve therein, and a cock in said second conduit opened by the first named mechanism to allow the passage of liquid to the last named mechanism.

In testimony whereof I affix my signature in presence of two witnesses.

DONALD ELDER.

Witnesses:
SOUREN G. LONG,
HAROLD M. STARRETT.

Copies of this patent may be obtained for five cents each, by addressing the "Commissioner of Patents, Washington, D. C."